United States Patent
Albal et al.

(10) Patent No.: US 7,512,223 B1
(45) Date of Patent: Mar. 31, 2009

(54) SYSTEM AND METHOD FOR LOCATING AN END USER

(75) Inventors: Nandakishore A Albal, Naperville, IL (US); Walter B Cook, Jr., Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/545,446

(22) Filed: Apr. 7, 2000

(51) Int. Cl.
*H04M 3/42* (2006.01)
*G01S 1/00* (2006.01)
*H04Q 7/20* (2006.01)

(52) U.S. Cl. .......................... 379/207.12; 340/539.13; 342/357.1; 455/456.3

(58) Field of Classification Search . 340/539.1–539.15; 342/357.06–357.1, 450; 379/37, 38, 207.12; 455/404.2, 456.1–456.6
See application file for complete search history.

(56) References Cited

U.S. PATENT DOCUMENTS

| | | | | |
|---|---|---|---|---|
| 5,485,163 A | * | 1/1996 | Singer et al. ................ | 342/457 |
| 5,602,901 A | * | 2/1997 | Redden et al. ........... | 455/404.2 |
| 5,890,061 A | * | 3/1999 | Timm et al. .............. | 455/404.2 |
| 5,946,618 A | * | 8/1999 | Agre et al. .................. | 455/428 |
| 6,198,914 B1 | * | 3/2001 | Saegusa .................... | 455/404.2 |
| 6,526,275 B1 | * | 2/2003 | Calvert ....................... | 455/418 |
| 6,584,307 B1 | * | 6/2003 | Antonucci et al. ....... | 455/422.1 |

* cited by examiner

*Primary Examiner*—Harry S Hong
(74) *Attorney, Agent, or Firm*—Hisashi D. Watanabe

(57) ABSTRACT

A method of assisting an end user is provides. A first assistance request signal is received from a communication device. A communication node determines an assistance center in close proximity to the communication device to provide assistance to the end user. The communication node then forwards a second assistance request signal to the assistance center. The communication node receives a first response signal from assistance center. Finally, the communication node transmits a second response signal to the communication device.

6 Claims, 5 Drawing Sheets

SYSTEM AND METHOD FOR LOCATING AN END USER

FIELD OF THE INVENTION

The present invention relates to communication systems, and, more particularly, to a method and system for locating an end user.

BACKGROUND OF THE INVENTION

Typically, global location systems can determine the location of an object, such as a ship or an aircraft, anywhere on the earth. One example of a presently-known location system is the Global Positioning System (GPS). GPS can determine the location of an object, in terms of latitudinal and longitudinal coordinates.

However, conventional GPSs, and other global location systems, are currently not included within end user communication devices, including, for example, cellular telephones and pagers. Such communication devices would allow these location systems to serve the additional functions of locating end users and/or for allowing end users to be found.

Accordingly, it would be desirable to have a system and method, which allows for the location of end users, as well as for the authorization of end users to be found, that overcomes the disadvantages described above.

DETAILED DESCRIPTION OF THE PRESENTLY PREFERRED EMBODIMENTS

Figure 1:
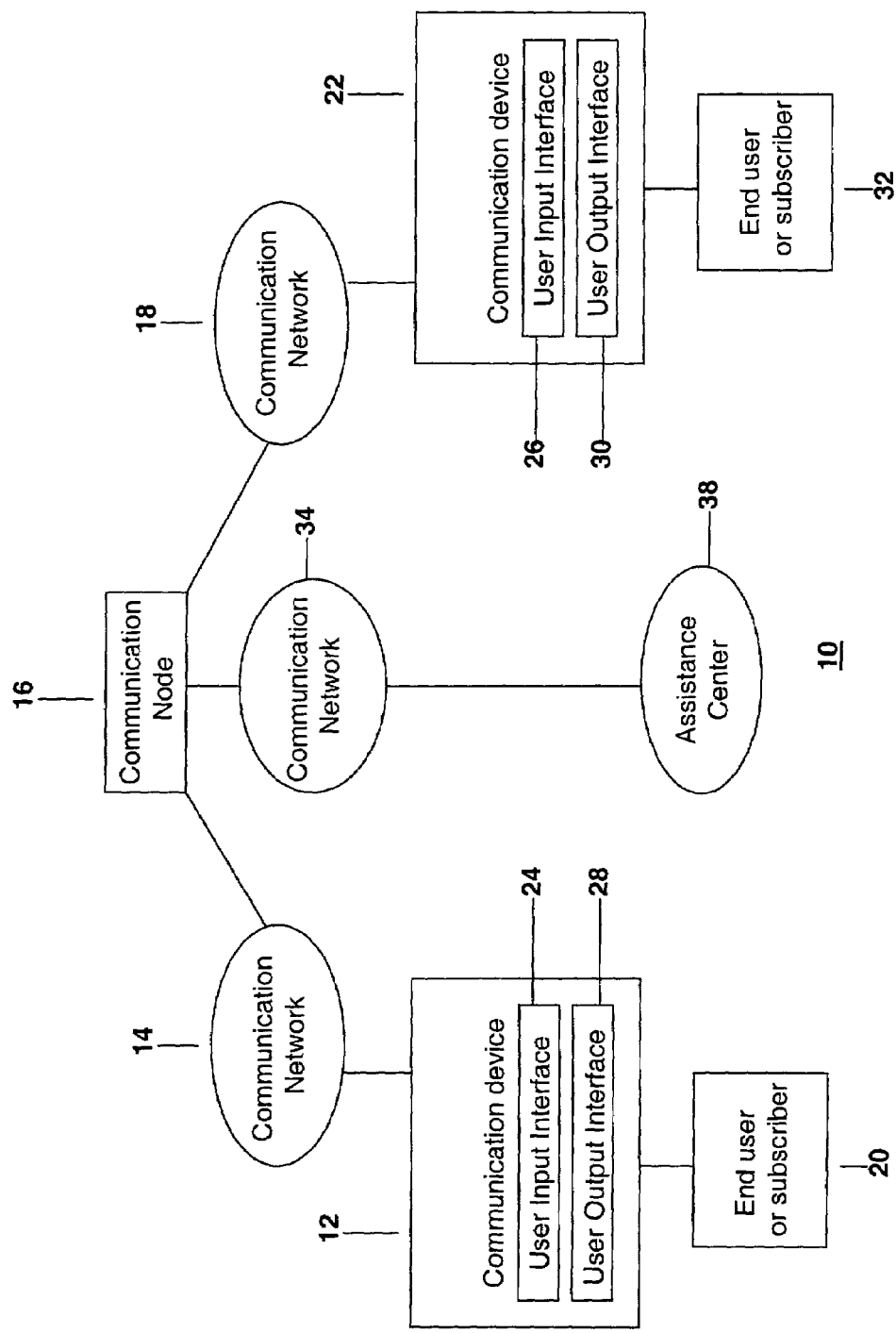
FIG. 1 is a block diagram of an embodiment of a communication system in accordance with the present invention.

FIG. 1 is a block diagram that illustrates an embodiment of a communication system 10. The communication system 10 generally includes one or more network access devices or communication devices 12, 22, communication networks 14, 18, 34, one or more assistance centers 38 (one being shown), and a communication node 16. As further described below, the communication system 10 can provide various services and capabilities to cellular end users, wire-line telephone end users, paging end users, satellite end users, mobile or portable telephone end users, trunked end users, computer network end users (e.g., Internet or Intranet end users), wireless data end users, branch office end users and the like.

The communication devices 12, 22 of the communication system 10 can be utilized by end users 20, 32 to access and/or connect with the communication node 16. The communication devices 12, 22 can include, but are not limited to, wireline telephones, mobile telephones, paging units, radio units, wireless data devices, Web telephones, portable or wireless telephones, personal information managers (PIMs), personal digital assistants (PDAs), personal computers (PCs), network televisions (TVs), Internet TVs, Internet telephones, portable wireless devices (i.e., two-way pagers), security systems (both mobile and premises-based), workstations or any other suitable communication devices.

Regardless of its specific form, the communication devices 12, 22 have user-input interfaces 24, 26 and/or user-output interfaces 28, 30. The user-input interfaces 24, 26 are for receiving input from the end users 20, 32 and the user-output interfaces 28, 30 are for providing output to the end users 20, 32. The user-input interfaces 24, 26 can include, but are not limited to, an electroacoustic transducer, such as, for example, a microphone to receive voice and other audible input from the end users 20, 32, a keypad or a keyboard to receive key strokes from the end users 20, 32, a touchpad or touchscreen to receive touch input from the end users 20, 32, and a pointing device such as a mouse or a trackball to receive point and click inputs from the end users 20, 32. The user-input interfaces 24, 26 may further include an assistance request button or key. When the assistance request button is depressed or activated, the communication devices 12, 22 can transmit an assistance request signal to the communication node 16, as further described below.

The user-output interfaces 28, 30 of the communication devices 12, 22 can include, but are not limited to, an electroacoustic transducer such as, for example, a speaker to provide voice and other audible output to the end users 20, 32, and a visual display device such as a liquid crystal display or a cathode ray tube to provide graphical and/or textual information to the end users 20, 32. It is noted that each of the communication devices 12, 22 may include more than one user-input interface 24, 26 and more than one user-output interface 28, 30. For example, a wireless telephone may have a microphone, a telephone keypad, a speaker, and a visual display device.

The communication devices 12, 22 may also include a Global Positioning System (GPS) chip, or other similar locator system which would allow the communication devices 12, 22 to determine their geographic location. It will also be recognized that the geographic location of the communication devices 12, 22 may be determined by an communication infrastructure-based system (i.e., cell and sector coordinates). Once the communication devices 12, 22 determine their geographic location, the communication devices 12, 22 may transmit their geographic location to the communication node 16. The communication devices 12, 22 may also transmit pre-recorded messages to the communication node 16. These pre-recorded messages may include, for example, a "Help Needed" message that specifies the situation in which assistance may be needed. The communication devices 12, 22 may also have the ability to accept messages from the communication node 16 and to provide the response to the end users 20, 32. The communication devices 12, 22 may be able to transmit the message to the end users 20, 32 even if the communication devices 12, 22 have been turned off by using, for example, an internal battery or other suitable apparatus.

The communication devices 12, 22 communicate with the communication node 16 via the communication networks 14, 18. The communication networks 14, 18 can interface with the communication devices 12, 22 through wireline or wireless networks or systems (i.e., telephone or televisions systems, Integrated Services Digital Network (ISDN) systems, coaxial lines, computer networks, digital end user lines, private networks, wireless local loop systems, etc.). It should be noted that the communication network 34 can interface with the assistance center 38 through similar systems and networks.

The communication networks 14, 18, 34 of the communication system 10 can include, but are not limited to, intranets, extranets, the Internet, a Local Area Network (LAN), a telephone network, (e.g., a Public Switched Telephone Network (PSTN), private telephone networks, etc.), a cellular network, satellite networks, a personal communication system, a TV network (e.g., a cable TV system), local, regional, national or global paging networks, an email system, a wireless data network (e.g., satellite data or local wireless data networks), a wireless LAN, a wireless local loop/distribution system (e.g., LMDS, MMDS or Code Division Multiple Access (CDMA) based system), a Voice Over Internet Protocol (VOIP) network, or any other suitable network. The communication networks 14, 18, 34 can also include a wide area network (WAN), such as, for example, the Internet, the World Wide Web (WWW) or any other similar on-line service. It will be recognized that the communication networks 14, 18, 34 may have portions in common, may comprise two separate networks, or may be the same network.

The communication node 16 of the communication system 10 can include, but is not limited to, an interactive voice response node, a server computer, the MIX™ platform and the Myosphere™ service provided by Motorola, Inc. of Schaumburg, Ill. (as further described with reference to FIG. 5), or other suitable system. It will be recognized that the communication node 16 may be integrated within or may be remote from the communication networks 14, 18, 34.

The communication node 16 can preferably send queries or messages to the communication devices 12, 22, accept responses from the communication devices 12, 22, and provide the geographic location of the communication devices 12, 22 to other end users 20, 32. The communication node 16 may store such designations, along with any other preferences, within an end user profile, which may be preferably located within a memory device located integral with, or remote from, the communication node 16.

Figure 2:
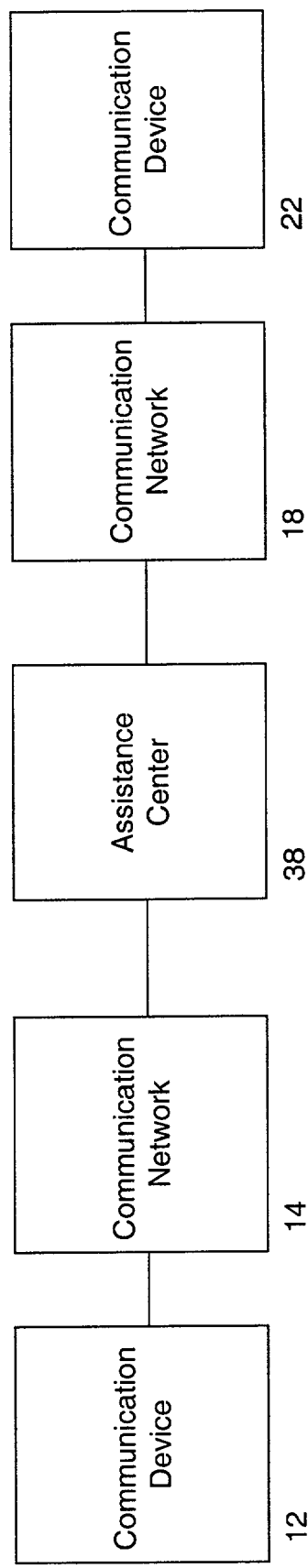
FIG. 2 is a block diagram of another embodiment of a communication system in accordance with the present invention.

The assistance center 38 of the communication system 10 may be a type of public assistance center, such as, for example, a 9-1-1 center, which dispatches emergency and rescue assistance to the general public. The assistance center 38 is preferably operatively connected to the communication node 16 via the communication network 34. It should be recognized that the assistance center 38 can be directly linked to the communication node 16 by, for example, a telecommunication link. The assistance center 38 may also be integrated into the communication system 10 as shown in FIG. 2.

The assistance center 38 preferably provides assistance to end users 20, 32. Customer service agents or electronic agents trained to respond to requests may staff the assistance center 38 by the end users 20, 32 for assistance. Assistance may take various forms, including, for example, providing emergency rescue assistance when the end user is in need of assistance or is in danger. Preferably, the assistance center 38 would be available at all times to assist the end users 20, 32.

Figure 3:
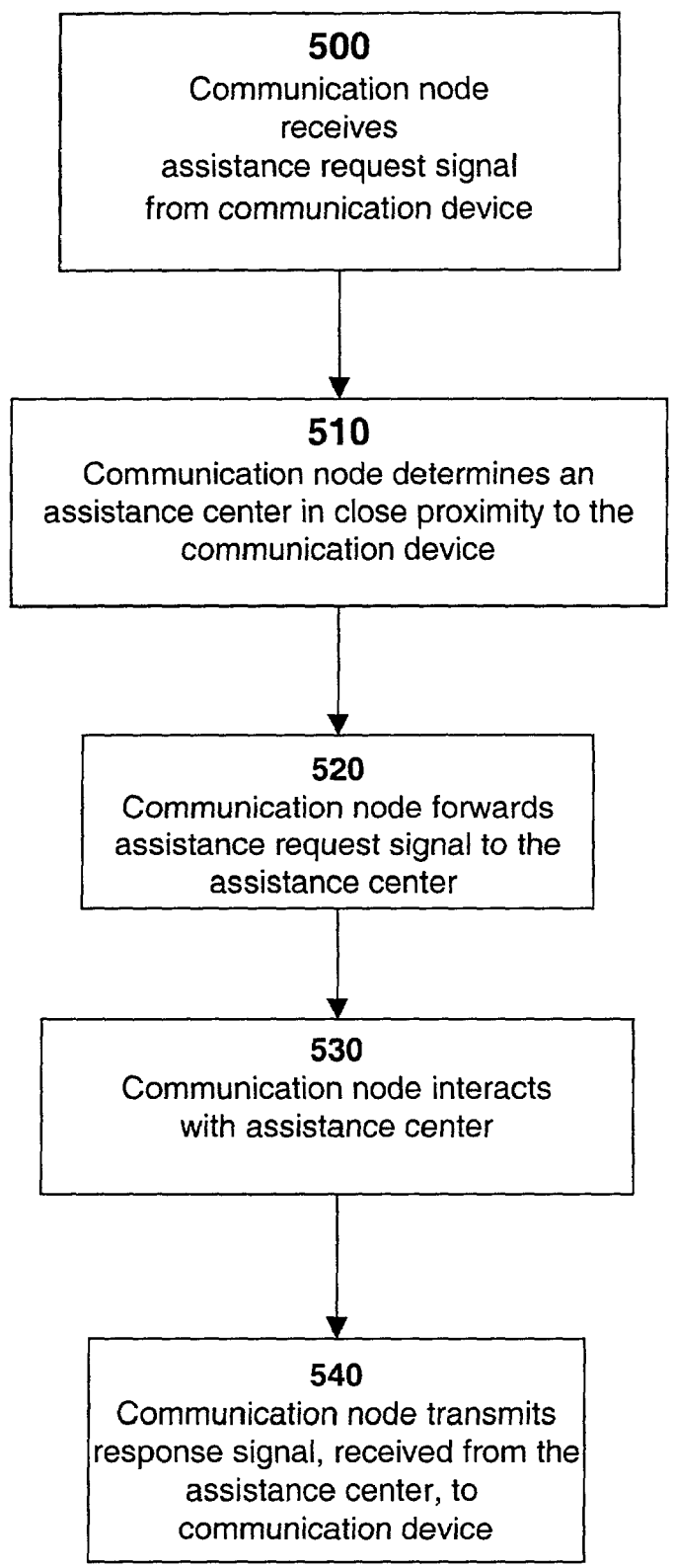
FIG. 3 is a flowchart of an embodiment of an end user location routine.

FIG. 3 illustrates one embodiment of a routine by which a communication node provides assistance to an end user. In general, a communication node receives an assistance request signal from a communication device, operated by an end user. The communication node then determines an assistance center in close proximity to the communication device. The communication node may determine the closest assistance center to the communication device. If the assistance center does not respond or is unable to provide assistance, the communication node can contact another assistance center.

The communication node forwards the assistance request signal to the assistance center. The assistance center then dispatches the necessary assistance to the end user. Finally, the communication node forwards a response signal to the communication device, to inform the end user that assistance will be provided.

At block 500, the communication node receives an assistance request signal transmitted from a communication device. The assistance request signal preferably includes geographical coordinates (i.e., longitudinal and latitudinal coordinates) corresponding to the location of the communication device. These geographic coordinates can be determined by utilizing a GPS chip incorporated in the communication device. The assistance request signal may also include information relating to the identity of the end user, the battery status of the communication device, any potential need for emergency assistance, as well as any other information relevant to the end user or the situation. The assistance request signal may take the form of a page transmission, a SMS message, an email message or a voice transmission. Alternatively, an assistance center may receive the assistance request signal directly from the communication device. After sending the assistance request signal, the communication device may change from an active mode to a passive mode to conserve battery power and to only respond to signals received from the communication node.

At block 510, the communication node determines an assistance center in close proximity to the communication device. Preferably, the assistance center may be a type of public assistance center, such as, for example, a 9-1-1 center, which dispatches emergency and rescue assistance to the general public. In determining the appropriate assistance center, the communication node preferably compares the location of the communication device, received in the assistance request signal, with the known locations of surrounding assistance centers. The location of assistance centers throughout the world may preferably be stored in a database to which the communication node has access.

Once the communication node has determined an assistance center to provide assistance to the end user, the communication node will forward the assistance request signal to the assistance center at block 520. Additional information relating to the end user, stored at or in communication with the communication node, may be sent along with the assistance request signal. This additional information may include, for example, pre-existing medical conditions of the end user and other unique aspects of the end user. If not received along with the assistance request signal, the communication node can interact with the customer service agents or electronic agents at the assistance center at block 530 to provide any other information relevant to the end user, including, for example, the identity of the end user, the location of the end user as well as any other information pertaining to the assistance and/or rescue of the end user, including, for example, any pre-existing medical conditions of the end user. Some or all of the requested information may reside at the communication node or in an end user database, which may be remote from or in communication with the communication node.

After a customer service agent or electronic agent decides to provide assistance to the end user, a response signal may be sent from the assistance center device to the communication node to inform the communication node that assistance will be provides to the end user. This response signal or any other suitable response message may then be forwarded on to the communication device at block 540. Preferably, the response signal may include a message informing the end user that assistance has been dispatched to their location. Additionally, the response signal may include instructions to the end user, such as, for example, "Stay Put", "Seek Shelter", etc.

Figure 4:
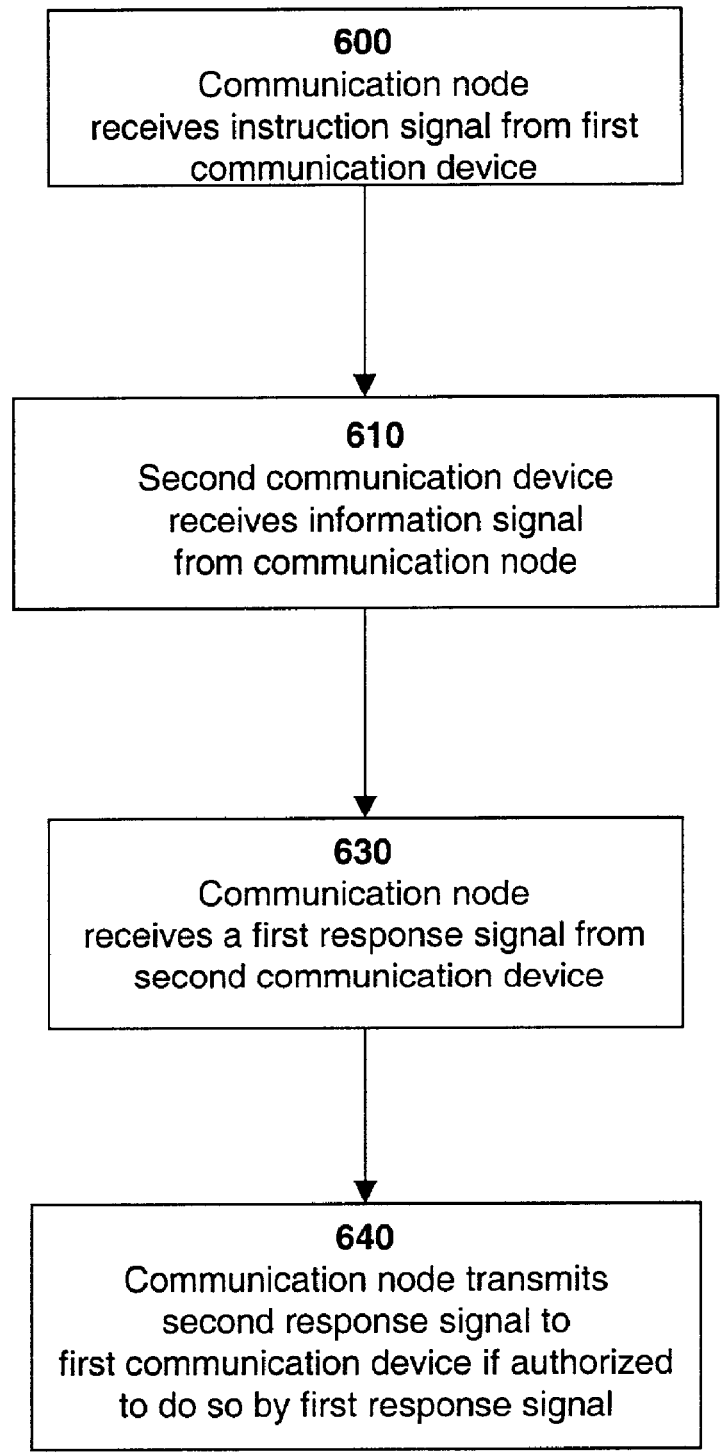
FIG. 4 is a flowchart of another embodiment of an end user location routine.

In another embodiment, the communication node also possesses the ability to locate an end user upon receiving a request by a party wishing to locate the end user as shown in FIG. 4. The communication node can allow the end user to designate under what specific conditions they wish to provide their geographic location to other end users or parties. At block 600, the communication node receives an instruction signal sent by the party via a first communication device. The instruction signal is preferably a request from the party instructing the communication node to locate a particular end user. The communication node may require the party to provide identification to prove the party's authorization, such as, for example, by sending a password to the communication node.

After the communication node receives the instruction signal from the first communication device at block 600, a second communication device of the end user will receive an information signal from the communication node at block 610. The information signal alerts the end user that a query requesting the location of the end user has been transmitted to the communication node and/or to the communication device.

Once the second communication device receives the information signal, the end user may respond by transmitting a first response signal to the communication node at block 630. In the first response signal, the end user will preferably indicate whether the end user wishes to provide the location of the end user. The first response signal may take the form of a page, an email message or a voice transmission. Furthermore, the first response signal may be inputted into the second communication device using either a voice-user interface (VUI), a graphical user interface (GUI), a keypad, or other suitable input apparatus.

In addition, the first response signal may include the location of the end user, as well as a unique identifying signal, used to identify the end user. This signal may include, but is not limited to, a personal identification number (PIN), a voice-, hand-, eye- or finger-print, etc., to assure the identity of the end user.

If the returned unique identifying method is incorrect or incomplete, the communication node may then be programmed to interpret such a response as an indication that the end user is under duress and/or needs assistance. In such an event, the communication node may preferably proceed with a method for providing assistance to the end user, as the method described above with reference to FIG. 3.

Based on the first response signal, the communication node will transmit a second response signal to the first communication device at block 640. As described above, the communication node transmits the second response signal if authorized to do so by the end user of the second communication device. Preferably, the second response signal will include the location of the end user, as well as any other information the end user has authorized the communication node to transmit to the party. Furthermore, similar to the first response signal, the second response signal may take the form of a page, an email message or a voice transmission to the pre-authorized party via the communication node.

Figure 5:
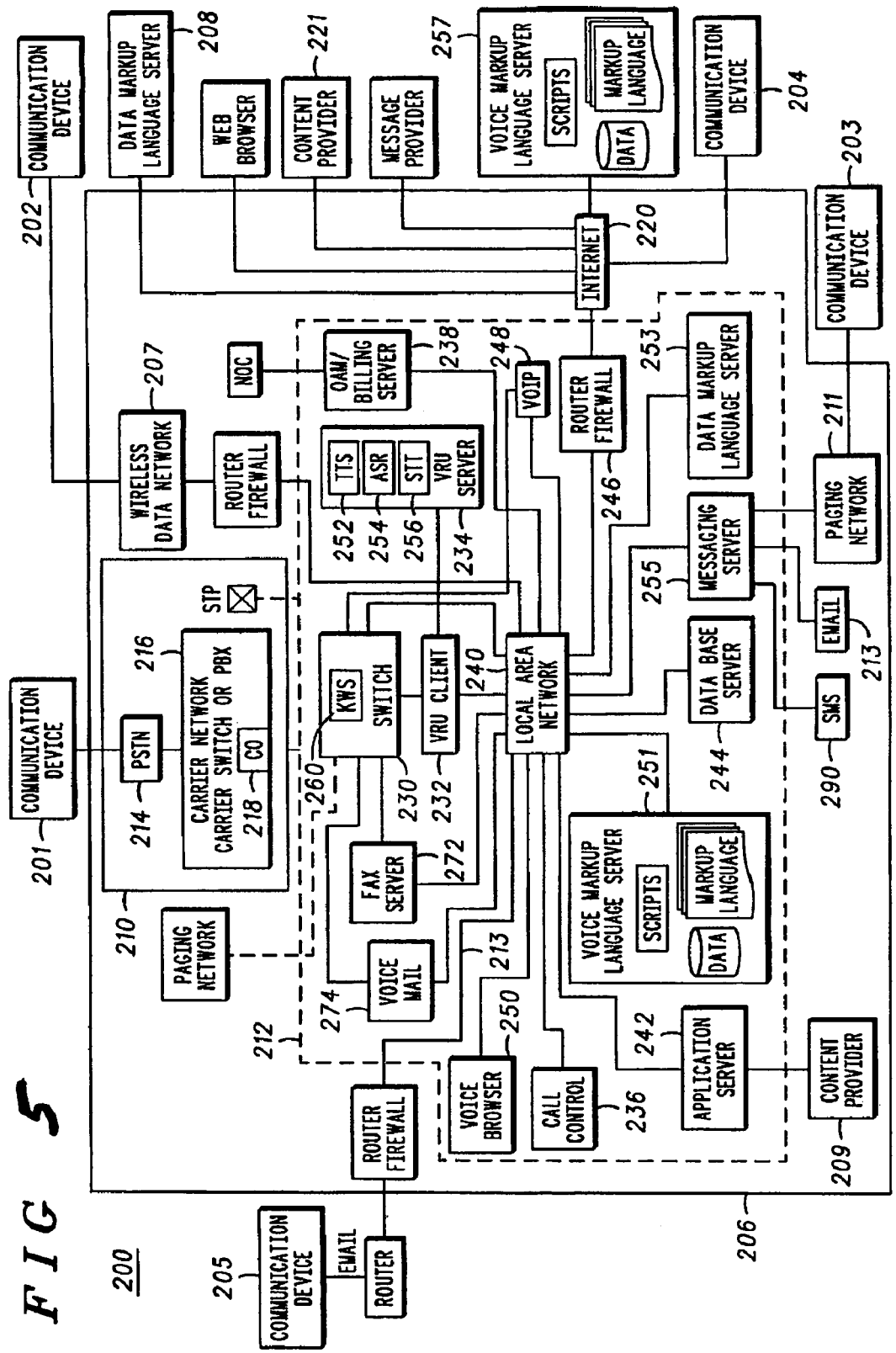
FIG. 5 is an exemplary block diagram of another embodiment of a communication system, in accordance with the present invention.

Referring now to FIG. 5, an exemplary block diagram of another embodiment of a communication system 200 having the capability to create and maintain an email usage record is illustrated. The communication system can implement the routines described in FIGS. 3-4, above.

The communication system 200 generally includes one or more communication devices 201, 202, 203, 204, 205 (five being shown), an electronic network 206, and one or more information sources (e.g., content providers 208, 221 (two being shown) and data and voice markup language servers 209, 251, 253, 257).

The end user can access the electronic network 206 by dialing a single direct access telephone number (e.g., a foreign exchange telephone number, a local telephone number, or a toll-free telephone number or PBX) from the communication device 201. The end user can also access the electronic network 206 from the communication device 202 via the Internet 220 or WWW, from the communication device 203 via a paging network 211, or from the communication device 205 via a LAN, a WAN, an email connection or in any other similar manner.

As shown in FIG. 5, the electronic network 206 includes a telecommunication network 210 and a communication node 212. The telecommunication network 210 is preferably connected to the communication node 212 via a high-speed data link, such as, for example, a T1 telephone line, a LAN, a WAN or a VOIP network. The telecommunication network 210 preferably includes a PSTN 214 and a carrier network 216. The telecommunication network 210 can also include, for example, international or local exchange networks, cable TV networks, inter-exchange carrier or long distance carrier networks, cellular networks (e.g., mobile switching centers), PBXs, satellite systems, wireless data networks and other switching centers such as conventional or trunked radio systems (not shown), etc. The electronic network 206 can also include additional telecommunication networks, such as, for example, a wireless data network 207.

The PSTN 214 can include various types of communication equipment, such as, for example, ATM networks, Fiber Distributed Data networks (FDDI), T1 lines, cable TV networks, VOIP networks and the like. The carrier network 216 generally includes a telephone switching system or central office 218.

It will be recognized that the carrier network 216 can be any suitable system that can route calls to the communication node 212, and the central office 218 can be any suitable wire-line or wireless switching system.

The communication node 212 is preferably configured to receive and process incoming calls from the carrier network 216 and the Internet 220. The communication node 212 can receive and process pages from the paging network 211 and can also receive and process messages (e.g., emails) from the LAN, WAN, wireless data or email system 213.

When an end user dials into the electronic network 206 from the communication device 201, the carrier network 216 routes the incoming call from the PSTN 214 to the communication node 212 over one or more telephone lines or trunks. The incoming calls preferably enter the carrier network 216 through one or more "888" or "800" Inward Wide Area Telecommunications Services trunk lines, local exchange or long distance trunk lines. It is also contemplated that the incoming calls can be received from a cable, cellular or VOIP network or any other suitable system.

The communication node 212 answers the incoming call from the carrier network 216 and retrieves an appropriate announcement (e.g., a welcome greeting) from a database, server or browser. The communication node 212 then plays the announcement to the caller. In response to audio inputs from the end user, the communication node 212 retrieves information from a destination or database of one or more of the information sources, such as the content providers 208, 221 or the markup language servers 209, 251, 253, 257. After the communication node 212 receives the information, it provides a response to the end user based upon the retrieved information.

The communication node 212 can provide various dialog voice personalities (e.g., a female voice, a male voice, etc.), and can implement various grammars (e.g., vocabulary) to detect and respond to the audio inputs from the end user. In addition, the communication node 212 can automatically select various speech recognition models (e.g., English, Spanish or English accent models) based upon an end user's profile, communication device and/or speech patterns. The communication node 212 can also allow the end user to select a particular speech recognition model.

When an end user accesses the electronic network 206 from a communication device 201, 202, 203, 204, 205 registered with the system (e.g., home telephone, work telephone, cellular telephone, etc.), the communication node 212 can by-pass an end user screening option and automatically identify the end user (or the type of communication device) through the use of ANI or CLI. After the communication node 212 verifies the call, the communication node 212 provides a greeting (e.g., "Hi, this is your personal agent, Maya. Welcome Bob. How may I help you?"). The communication node 212 then enters into a dialogue with the end user, and the end user can select a variety of services offered by the communication node 212.

When the end user accesses the electronic network 206 from a communication device not registered with the system (e.g., a payphone, a telephone of a non-end user, etc.), the communication node 212 answers the call and prompts the end user to enter his or her name and/or a personal identification number (PIN) using voice commands or DTMF signals. The communication node 212 can also utilize speaker verification to identify the particular speech pattern of the end user. If the communication node 212 authorizes the end user to access the system, the communication node 212 provides a personal greeting to the end user (e.g., "Hi, this is your personal agent, Maya. Welcome Ann. How may I help you?").

The communication node 212 then enters into a dialogue with the end user, and the end user can select various services offered by the communication node 212. If the name and/or PIN of the end user cannot be recognized or verified by the communication node 212, the end user will be routed to a customer service representative.

Once the end user has accessed the communication system 200, the end user may implement a wide variety of services and features by using voice commands, such as, for example, voice dialing, voice paging, facsimiles, caller announcements, voice mails, reminders, call forwarding, call recording, content information (e.g., newspapers, etc.), read email, read calendars, read "to-do" lists, banking, e-commerce. The communication system 200 can place outbound calls and pages to business and personal parties or contacts (e.g., friends, clients, business associates, family members, etc.) in response to DTMF signals or voice commands. The calls can be routed through a telephone or electronic network to the selected party and the pagers can be sent to a selected party via a paging system. The communication system 200 can also receive calls routed through a telephone or electronic network.

As shown in FIG. 5, the communication node 212 preferably includes a telephone switch 230, a voice or audio recognition (VRU) client 232, a VRU server 234, a controller or call control unit 236, an Operation and Maintenance Office or a billing server unit 238, a LAN 240, an application server unit 242, a database server unit 244, a gateway server or router firewall server unit 246, a VOIP unit 248, a voice browser 250, a voice markup language server 251, a messaging server 255 and a data markup language server 253. Although the communication node 212 is shown as being constructed with various types of independent and separate units or devices, the communication node 212 can be implemented by one or more integrated circuits, microprocessors, microcontrollers or computers which may be programmed to execute the operations or functions equivalent to those performed by the devices or units shown. It will also be recognized that the communication node 212 can be carried out in the form of hardware components and circuit designs and/or software or computer programs.

The communication node 212 can be located in various geographic locations throughout the world or the United States (e.g., Chicago, Ill.). The communication node 212 can be operated by one or more carriers (e.g., Sprint, Qwest, MCI, etc.) or independent service providers (e.g., Motorola, Inc.).

The communication node 212 can be integrated with the carrier network 216 or can be located remote from the carrier network 216. It is also contemplated that the communication node 212 may be integrated into a communication device, such as, for example, a wire-line or wireless telephone, a radio device, a PC, a PDA, a PIM, etc., and can be programmed to connect or link directly to an information source.

The communication node 212 can also be configured as a standalone system to allow end users to dial directly into the communication node 212 via a direct access telephone number. In addition, the communication node 212 may comprise a telephony switch (e.g., a PBX or Centrix unit), an enterprise network or a LAN. In this configuration, the communication system 200 can be implemented to automatically connect an end user to the communication node 212 when the end user accesses a communication device.

When the telephone switch 230 receives an incoming call from the carrier network 216, the call control unit 236 sets up a connection in the telephone switch 230 to the VRU client 232. The communication node 212 then enters into a dialog with the end user regarding various services and functions. The VRU client 232 preferably generates pre-recorded voice announcements and/or messages to prompt the end user to provide inputs to the communication node 212 using voice commands or DTMF signals.

In response to the inputs from the end user, the communication node 212 retrieves information from a destination of one of the information sources and provides outputs to the end user.

The telephone switch 230 is preferably connected to the VRU client 232, the VOIP unit 248 and the LAN 240. The telephone switch 230 receives incoming calls from the carrier network 216. The telephone switch 230 also receives incoming calls from the communication device 202 routed over the Internet 220 via the VOIP unit 248. The telephone switch 230 also receives messages and pages from communication devices 203, 205, respectively. The telephone switch 230 is preferably a digital cross-connect switch, Model LNX, available from Excel Switching Corporation, Hyannis, Mass. It will be recognized that the telephone switch 230 can be any suitable switch.

The VRU client 232 is preferably connected to the VRU server 234 and the LAN 240. The VRU client 232 processes voice communications, DTMF signals, pages and messages (e.g., emails). Upon receiving voice communications, the VRU client 232 routes the speech communications to the VRU server 234. When the VRU client 232 detects DTMF signals, it sends a command to the call control unit 236. It will be recognized that the VRU client 232 can be integrated with the VRU server 234.

The VRU client 232 preferably comprises a PC, such as, for example, a Windows NT compatible PC, with hardware capable of connecting individual telephone lines directly to the telephone switch 230 or carrier network 216. The VRU client 232 preferably includes a microprocessor, random access memory, read-only memory, a T1 or ISDN interface board, and one or more voice communication processing boards (not shown). The voice communication processing boards are preferably Dialogic boards, Antares Model, available from Dialogic Corporation, Parsippany, N.J. The voice communication boards may include a voice recognition engine having a vocabulary for detecting a speech pattern. The voice recognition engine is preferably a RecServer software package, available from Nuance Communications, Menlo Park, Calif.

The VRU client 232 can also include an echo canceler (not shown) to reduce or cancel TTS or playback echoes transmitted from the PSTN 214 due to hybrid impedance mismatches. The echo canceler is preferably included in an Antares Board Support Package, also available from Dialogic.

The call control unit 236 is preferably connected to the LAN 240, and sets up the telephone switch 230 to connect incoming calls to the VRU client 232. The call control unit 236 also sets up incoming calls or pages to the communication node 212 over the Internet 220 and pages and messages sent from the communication devices 203, 205 via the paging network 211 and email system 213, respectively. The control call unit 236 preferably comprises a PC, such as, for example, a Windows NT compatible PC.

The LAN 240 allows the various components and devices of the communication node 212 to communicate with each other via twisted pair, fiber optic, coaxial cables or the like. The LAN 240 may use Ethernet, Token Ring or other suitable types of protocols. The LAN 240 is preferably a 100 Megabit per second Ethernet switch, available from Cisco Systems, San Jose, Calif., and can comprise any suitable network system. The communication node 212 may include a plurality of LANs.

The VRU server 234 is connected to the VRU client 232 and the LAN 240. The VRU server 234 receives voice communications from the end user via the VRU client 232. The VRU server 234 processes the voice communications and compares the voice communications against a vocabulary or grammar stored in the database server unit 244 or a similar memory device.

The VRU server 234 provides output signals, representing the result of the voice communications processing, to the LAN 240. The LAN 240 routes the output signal to the call control unit 236, the application server unit 242 and/or the voice browser 250. The communication node 212 then performs a specific function associated with the output signals.

The VRU server 234 preferably includes a TTS unit 252, an automatic speech recognition (ASR) unit 254, and a STT unit 256. The TTS unit 252 receives textual data or information (e.g., email, web pages, documents, files, etc.) from the application server unit 242, the database server unit 244, the call control unit 236, the gateway server unit 246, the application server unit 242 and the voice browser 250. The TTS unit 252 processes the textual data and converts the data to voice data or information.

The TTS unit 252 can provide data to the VRU client 232, which reads or plays the data to the end user. For example, when the end user requests information (e.g., news updates, stock information, traffic conditions, etc.), the communication node 212 retrieves the desired data (e.g., textual information) from a destination of the one or more of the information sources and converts the data via the TTS unit 252 into a response.

The response is then sent to the VRU client 232. The VRU client 232 processes the response and reads an audio message to the end user based upon the response. It is contemplated that the VRU server 234 can read the audio message to the end user using human recorded speech or synthesized speech. The TTS unit 252 is preferably a TTS 2000 software package, available from Lernout and Hauspie Speech Product NV, Burlington, Mass.

The ASR unit 254 provides speaker dependent or independent automatic voice recognition of voice communications from the end user. It is contemplated that the ASR unit 254 can include speaker dependent voice recognition. The ASR unit 254 processes the voice communications to determine whether a word or a speech pattern matches any of the grammars or vocabulary stored in the database server unit 244 or downloaded from the voice browser 250. When the ASR unit 254 identifies a selected speech pattern of the voice communications, the ASR unit 254 sends an output signal to implement the specific function associated with the recognized speech pattern. The ASR unit 254 is preferably a speaker independent voice recognition software package, RecServer Model, also available from Nuance Communications. It is contemplated that the ASR unit 254 can be any suitable voice recognition unit to detect voice communications.

The STT unit 256 receives voice communications and converts the voice communications to textual information (e.g., a text message). The textual information can be sent or routed to the communication devices 201, 202, 203, 204, 205, the content providers 208, 221, the markup language servers 209, 251, 253, 257, the voice browser 250 and the application server unit 242. The STT unit 256 is preferably a Naturally Speaking software package, available from Dragon Systems, Newton, Mass.

The VOIP unit 248 is preferably connected to the telephone switch 230 and the LAN 240. The VOIP unit 248 allows an end user to access the communication node 212 via the Internet 220 or VOIP public network using voice commands. The VOIP unit 248 can receive VOIP protocols (e.g., H.323 protocols) transmitted over the Internet 220 or Intranet, and can convert the VOIP protocols to voice information or data. The voice information can then be read to the end user via the VRU client 232.

The VOIP unit 248 can also receive voice communications from the end user and convert the voice communications to a VOIP protocol that can be transmitted over the Internet 220. The VOIP unit 248 is preferably a Voice Net software package, also available from Dialogic Corporation. It will be recognized that the VOIP unit 248 can be incorporated into a communication device.

The communication node 212 also includes a detection unit 260. The detection unit 260 is preferably a phrase or key word spotter unit, detecting incoming audio inputs or communications or DTMF signals from the end user. The detection unit 260 is preferably incorporated into the telephone switch 230, but can be incorporated into the VRU client 232, the carrier network 216 or the VRU server 234. The detection unit 260 is preferably included in a RecServer software package, also available from Nuance Communications.

The detection unit 260 records the audio inputs from the end user and compares the audio inputs to the vocabulary or grammar stored in the database server unit 244. The detection unit 260 continuously monitors the end user's audio inputs for a key phase or word after the end user is connected to the node 212. When the detection unit 260 detects the key phrase or word, the VRU client 232 plays a pre-recorded message to the end user. The VRU client 232 then responds to the audio inputs provided by the end user.

The billing server unit 238 is preferably connected to the LAN 240. The billing server unit 238 can record data about the use of the communication node 212 by an end user (e.g., length of calls, features accessed by the end user, etc.). Upon completion of a call by an end user, the call control unit 236 sends data to the billing server unit 238. The billing server unit 238 can subsequently process the data in order to prepare customer bills. The billing server unit 238 can use the ANI or CLI of the communication device to properly bill the end user. The billing server unit 238 preferably comprises a Windows NT compatible PC.

The gateway server unit 246 is preferably connected to the LAN 240 and the Internet 220. The gateway server unit 246 provides access to the content provider 221 and the voice markup language server 257 via the Internet 220. The gateway server unit 246 allows end users to access the communication node 212 from the communication device 202 via the Internet 220. The gateway server unit 246 can function as a firewall to control access to the communication node 212 to authorized end users. The gateway server unit 246 is preferably a Cisco Router, also available from Cisco Systems.

The database server unit 244 is preferably connected to the LAN 240. The database server unit 244 preferably includes a plurality of storage areas to store data relating to end users, such as, for example, speech vocabularies, dialogs, personalities, end user entered data, and other information. Preferably, the database server unit 244 stores a personal file or address book. The personal address book can contain information required for the operation of the communication system 200, including end user reference numbers, personal access codes, personal account information, contact's addresses, telephone numbers, etc. The database server unit 244 is preferably a PC, such as, for example, a Windows NT compatible PC.

The application server unit 242 is preferably connected to the LAN 240 and the content provider 208. The application server unit 242 allows the communication node 212 to access information from a destination of the information sources, such as the content providers 208, 221 and the markup language servers 209, 251, 253, 257. For example, the application server unit 242 can retrieve information (e.g., weather reports, stock information, traffic reports, restaurants, flower shops, banks, calendars, "to-do" lists, e-commerce, etc.) from a destination of the information sources. This application server unit 242 may include Starfish Software to provide the address book, calendar and to-do lists, and to allow the end user to organize information. The application server unit 242 processes the retrieved information and provides the information to the VRU server 234 and the voice browser 250. The VRU server 234 can provide an audio announcement to the end user based upon the information using TTS synthesizing or human recorded voice. The application server unit 242 can also send tasks or requests (e.g., transactional information) received from the end user to the information sources (e.g., a request to place an order for a pizza). The application server unit 242 can further receive end user inputs from the VRU server 234 based upon a speech recognition output. The application server unit 242 is preferably a PC.

The voice markup language server 251 is preferably connected to the LAN 240. The voice markup language server 251 can include a database, scripts and markup language documents or pages. The voice markup language server 251 is preferably a PC, such as, for example, a Windows NT compatible PC. It will also be recognized that the voice markup language server 251 can be an Internet server (e.g., a Sun Microsystems server).

The messaging server 255 is preferably connected to the LAN 240, the paging network 211, an email system 213 and a short message system (SMS) 290. The messaging server 255 routes pages between the LAN 240 and the paging network 211. The messaging server 255 is preferably a PC, such as, for example, a Windows NT compatible PC. The messaging server 255 can also provide direct storage. It is contemplated that the messaging server 255 can reside externally from the communication node 212.

The voice browser 250 is preferably connected to the LAN 240. The voice browser 250 preferably receives information from the markup language servers 209, 251, 253, 257, the database server unit 244 and the content providers 208, 221. In response to voice commands or DTMF signals, the voice browser 250 generates a content request (e.g., an electronic address) to navigate to a destination of one or more of the information sources. The content request can use at least a portion of a Uniform Resource Locator, an Internet Protocol, a page request, or email.

After the voice browser 250 is connected to an information source, the voice browser 250 preferably uses a Transmission Control Protocol/Internet Protocol connection to pass requests to the information source. The information source responds to the requests, sending at least a portion of the requested information, represented in electronic form, to the voice browser 250. The information can be stored in a database, and can include text content, markup language document or pages, non-text content, dialogs, audio sample data, recognition grammars, etc. The voice browser 250 then parses and interprets the information, further described below. The voice browser 250 can be integrated into the communication devices 201, 202, 203, 204, 205.

As shown in FIG. 5, the content provider 208 is connected to the application server unit 242 of the communication node 212, and the content provider 221 is connected to the gateway server unit 246 of the communication node 212 via the Internet 220. The content providers 208, 221 can store various content information, such as, for example, news, banking, commerce, weather, traffic conditions, etc. The content providers 208, 221 can include a server to operate WWW pages or documents in the form of a markup language. The content providers 208, 221 can also include a database, scripts and/or markup language documents or pages. The scripts can include images, audio, grammars, computer programs, etc. The content providers 208, 221 execute suitable server software to send requested information to the voice browser 250.

The voice mail unit 274 is preferably connected to the telephone switch 203 and the LAN 240. The voice mail unit 274 can store voice mail messages from parties trying to send messages to the communication node 212. When an end user accesses the electronic network 206, the voice mail unit 274 can notify the end user of new and stored messages. The end user can access the messages to play, delete, store and forward the messages. When the end user accesses a message, the message can be read to the end user or can be displayed as textual information on a communication device (e.g., a pager, a SMS 290, or a PDA, etc.). The end user can also access and operate external messages or mail systems remote from the electronic network 206.

The FAX server unit 272 is preferably connected to the telephone switch 230 and the LAN 240. The FAX server unit 272 receivers and stores facsimile information sent via the electronic network 206 or the carrier network 216. Subscribers can access the facsimile information to play, store, delete, and forward the information. The facsimile information can be read via the TTS unit 252 or can be displayed as textual information on a suitable communication device. The FAX server unit 272 preferably comprises a PC, such as, for example, a Windows NT compatible PC or a Dialogue Fax Server.

Further information regarding communication system 200 is disclosed in U.S. patent application Ser. No. 09/141,485, entitled Telecommunication System and Methods Therefor, filed Aug. 27, 1998, the entire disclosure of which is incorporated herein.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

We claim:

1. A method of determining the location of an end user comprising the steps of:
   receiving a first signal from a first communication device at a communication node;
   transmitting a second signal from the communication node to a second communication device;
   receiving a first response signal from the second communication device at the communication node, the first response signal including an authorization signal, a unique identifying signal, and a geographic location of the second communication device, wherein the geographic location includes a global positioning system coordinate or an infrastructure-based coordinate;
   transmitting the geographic location to the first communication device from the communication node in response to the first response signal;
   comparing the unique identifying signal to a stored unique identifying signal corresponding to the end user;
   determining an assistance center near the second communication device if the unique identifying signal does not match the stored unique identifying signal; and
   providing assistance to the end user if the unique identifying signal does not match the stored unique identifying signal.

2. The method of claim 1, further including the step of transmitting an identification signal from the first communication device to the communication node when the first signal is received.

3. The method of claim 1, wherein the first response signal includes an instruction to transmit the second response signal to the first communication device.

4. The method of claim 1, wherein the geographic location includes a set of coordinates of the second communication device.

5. The method of claim 1, wherein the first communication device includes one of a telephone, a paging unit, a cellular telephone, a satellite telephone and an Internet telephone.

6. The method of claim 1, wherein the second communication device includes one of a telephone, a paging unit, a cellular telephone, a satellite telephone and an Internet telephone.

* * * * *